United States Patent
Okazaki (10) Patent No.: US 10,107,432 B2
(45) Date of Patent: Oct. 23, 2018

(54) CONNECTING ARRANGEMENT FOR CONNECTING TUBE MEMBER TO ARTICLE

(71) Applicant: NIFCO INC., Kanagawa (JP)

(72) Inventor: Tsuyoshi Okazaki, Yokosuka (JP)

(73) Assignee: NIFCO INC., Kanagawa (JP)

( * ) Notice: Subject to any disclaimer, the term of this patent is extended or adjusted under 35 U.S.C. 154(b) by 1 day.

(21) Appl. No.: 15/027,298

(22) PCT Filed: Aug. 7, 2015

(86) PCT No.: PCT/JP2015/004000
§ 371 (c)(1),
(2) Date: Apr. 5, 2016

(87) PCT Pub. No.: WO2016/038789
PCT Pub. Date: Mar. 17, 2016

(65) Prior Publication Data
US 2017/0184240 A1    Jun. 29, 2017

(30) Foreign Application Priority Data

Sep. 12, 2014 (JP) ................................. 2014-186183

(51) Int. Cl.
*F16L 37/088* (2006.01)
(52) U.S. Cl.
CPC ......... *F16L 37/088* (2013.01); *F16L 2201/10* (2013.01)
(58) Field of Classification Search
CPC ...... F16L 37/0985; F16L 37/12; F16L 37/088
(Continued)

(56) References Cited

U.S. PATENT DOCUMENTS 7,963,565 B2 * 6/2011 Suter .................... A61C 19/002
285/3
2010/0253064 A1 * 10/2010 Le Quere ............ F16L 37/0982
285/3

FOREIGN PATENT DOCUMENTS

JP   2002327882 A   11/2002
JP   2004125158 A    4/2004
(Continued)

OTHER PUBLICATIONS

International Search Report of International Application No. PCT/JP2015/004000, dated Nov. 2, 2015, 3 pages.

*Primary Examiner* — David Bochna
(74) *Attorney, Agent, or Firm* — Armstrong Teasdale LLP (57) ABSTRACT

Provided is a connecting arrangement (2) for connecting a tube member to an article (8) that prevents the connector from being re-used once it has been disconnected so that the user may be prevented from disconnecting and reconnecting the tube member once again. A lock member (12) for engaging an engagement portion (72, 94) of the tube member (6, 86) is positioned inside the inner circumferential surface of the connector main body (10) so as not to be accessible from outside. The connector main body is provided with a frangible part (62, 78) that is destroyed when a force exceeding a prescribed level is applied to the connector main body. Once the connector main body is destroyed at the frangible part, the lock member is exposed to the outside so that the engagement portion can be disengaged. In order to disconnect the tube member, the connector main body is required to be destroyed so that the connector cannot be re-used once it has been disconnected.

8 Claims, 5 Drawing Sheets (58) Field of Classification Search
USPC .......................................................... 285/3
See application file for complete search history.

(56) References Cited

FOREIGN PATENT DOCUMENTS

| JP | 2005074149 A | 3/2005 |
|---|---|---|
| JP | 2007002866 A | 1/2007 |
| JP | 2013534993 A | 9/2013 |

* cited by examiner

CONNECTING ARRANGEMENT FOR CONNECTING TUBE MEMBER TO ARTICLE

TECHNICAL FIELD

The present invention relates to a connecting arrangement for connecting a tube member to an article, and in particular to a connecting arrangement for connecting a tube member for conducting automotive blow-by gas to an article by using a connector.

BACKGROUND ART

As an arrangement for connecting a tube member for conducting automotive blow-by gas to an article, it is known to use a metallic band. With the aim to facilitate the connecting work, it is also proposed to use a connector. See Patent Document 1, for instance.

The connecting arrangement disclosed in Patent Document 1 not only facilitates the connecting work but also performs the function to indicate that the tube member has been disconnected and reconnected once again. In the arrangement, a sleeve is incorporated in the connector main body, and in order to remove the tube member, it is necessary to remove the sleeve and insert a tool into the connector main body. The sleeve includes a connecting part that is connected to the connector main body and a sleeve main body for preventing the insertion of the tool, and these two parts are connected to each other with a narrow arm section. Only if the sleeve main body is removed from the connector main body by breaking the arm portion, the tool can be inserted and the tube member can be removed from the connector main body. Therefore, when the tube member is connected to the connector once again, it can be discerned that the tube member has been disconnected and connected once again because the arm portion is broken.

PRIOR ART DOCUMENT(S)

Patent Document(s)

Patent Document 1 JP2007-2866A

SUMMARY OF THE INVENTION

Task to be Accomplished by the Invention

Connecting arrangements often require safety and environmental considerations as in the case of the connecting arrangement for a tube member for conducting blow-by gas. A leak detector may be used for detecting any leakage, but it increases the manufacturing cost. Sometimes, a connecting structure configured to prevent any inadvertent detachment of the tube member is used as disclosed in Patent Document 1. However, according to the structure disclosed in Patent Document 1, it is possible for a person lacking in knowledge and skill to disconnect and reconnect the tube member by oneself. In such a case, it is possible that the connecting work is not properly performed, and a risk of blow-by gas leakage may be created. Owing to the breakage of the arm portion, it can be discerned that the tube member has been disconnected and reconnected once again, but the leakage of blow-by gas due to improper connecting work may have persisted for a prolonged period of time before a properly trained car mechanic has an opportunity to inspect the integrity of the arm portion. On the other hand, if the connecting arrangement consists of a permanent one so that a user is totally prevented from disconnecting and connecting the tube member once again, when any repair work is required, the entire assembly including the tube member has to be replaced, and the work efficiency and the maintenance economy are both impaired.

The present invention was made in view such problems of the prior art, and has a primary object to provide a connecting arrangement that prevents the connector from being re-used once it has been disconnected so that the user may be prevented from disconnecting and reconnecting the tube member once again.

Means for Accomplishing the Task

To achieve such an object, the present invention provides a connecting arrangement (2) for connecting a tube member to an article (8), comprising: a tube member (6, 86) provided with an engagement portion (72, 94) on an outer circumferential surface thereof; a connector main body (10) attached to an article to be connected and defining an inner bore (42) for receiving an end of the tube member; and a lock member (12) positioned on an inner circumferential surface side of the connector main body and engaging the engagement portion so as not to be disengaged from outside; wherein the connector main body is provided with a frangible part (62, 78) that is preferentially destroyed when a force greater than a prescribed level is applied thereto, and is positioned so as to place the lock member in an accessible condition for removal of the lock member when the connector main body is destroyed.

According to this arrangement, in order to disconnect the tube member from the connector main body, the connector main body has to be destroyed. Therefore, once the tube member is disconnected, the connector becomes unusable so that the user is prevented from disconnecting and reconnecting the tube member.

In this invention, it may be arranged such that a rotation preventing structure (58, 80) is provided between the connector main body and the tube member for preventing a relative rotation between the connector main body and the tube member when the lock member engages the engagement portion, and the force consists of a torque that tends to rotate the connector main body and the tube member relative to each other.

According to this arrangement, a relatively large torque may be applied to the connector main body by using a tool using a lever mechanism so that the tube member may be disconnected from the connector without any undue difficulty.

In this invention, it may be arranged such that the rotation preventing structure comprises a non-circular recess (54, 84) provided in an end surface of the connector main body and a fitting part of the tube member (56, 88) which is configured to fit into the non-circular recess in a complementary fashion.

This rotation preventing structure can perform the function of preventing the relative rotation in a reliable manner.

In this invention, the fitting part may comprise a flange provided on an outer periphery of the tube member.

According to this arrangement, the fitting part may be formed as a relatively large component so that the force acting upon the fitting part may be distributed over a large volume of the flange, and the mechanical strength of the fitting part may be made significantly greater than that of the frangible part. Thereby, the tube member can be prevented from being damaged, and may be used once again without requiring the replacement of the tube member.

In this invention, the non-circular recess and the fitting part may be configured to fit one into another only when the non-circular recess and the fitting part are aligned with each other at a prescribed angular relationship.

Thereby, the relative angular position between the connector main body and the tube member can be uniquely determined so that the connector main body and the tube member can be connected in a properly aligned condition without fail.

In this invention, it may be arranged such that the connector main body comprises a housing (18) provided with an open end (22) facing away from the article to be connected and a sleeve (20, 74, 82) received in the open end and connected to the housing, the sleeve defining the inner bore; and wherein the lock member is retained by the sleeve and covered by the housing.

According to this arrangement, because the lock member retained by the sleeve is covered by the housing, the engagement between the lock member and the engagement portion is prevented from being released from outside by using a highly simple structure.

In this invention, the frangible part may comprise a bonded part (62) between the housing and the sleeve.

According to this arrangement, when the connector main body is destroyed in order to disconnect the tube member, the housing and the sleeve are separated from each other. Therefore, the lock member is exposed so as to be accessible from outside, thereby allowing the engagement between the lock member and the engagement portion to be released with ease.

In this invention, it may be arranged such that the sleeve comprises a pair of retaining holes (52) radially passed through the sleeve and extending circumferentially, and the lock member is configured to engage the engagement portion of the tube member by being received in the retaining holes.

According to this arrangement, the manufacturing of the connector is facilitated, and when the connector main body is destroyed, the lock member can be easily removed.

In this invention, it may be arranged such that the lock member comprises a wire member including a pair of parallel leg portions (64), and the engagement portion is provided on an outer periphery of the tube member, the engagement portion including a groove (72) or a step (94) for engaging the leg portions.

According to this arrangement, the lock member, which is exposed to the outside once the connector main body is destroyed, can be easily disengaged from the engagement portion by deforming the lock member by using a tool or the like.

In this invention, it may be arranged such that the leg portions are made of elastically deformable material, and a front end part of the tube member is provided with a tapered surface for pushing apart the leg portions away from each other as the tube member is inserted.

According to this arrangement, with the simple action of pushing the tube member into the connector, the tube member can be engaged by the connector.

In this invention, the frangible part may be formed by a breakable part consisting of a thin walled portion (78) and/or holes formed in the connector main body.

According to this arrangement, the frangible part is formed separately from the connection between the housing and the sleeve so that freedom is increased in the selection of the structure for joining the housing and the sleeve to each other.

Effect of the Invention

Thus, in a connecting arrangement for connecting a tube member to an article to be connected, the connector is prevented from being re-used once it has been disconnected so that the user may be prevented from disconnecting and reconnecting the tube member once again.

MODES FOR CARRYING OUT THE INVENTION

Preferred embodiments of the present invention are described in the following with reference to the appended drawings.

Figure 1:
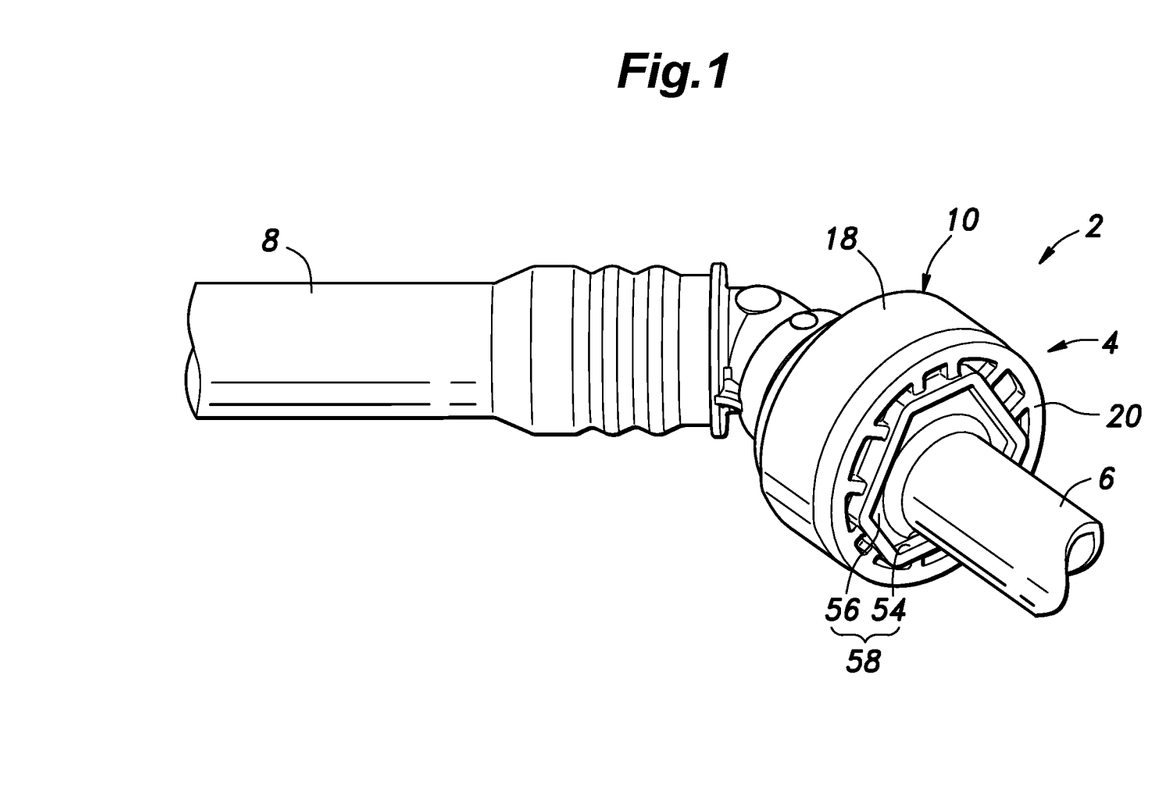
FIG. 1 is a perspective view of the connecting arrangement embodying the present invention.
Figure 2:
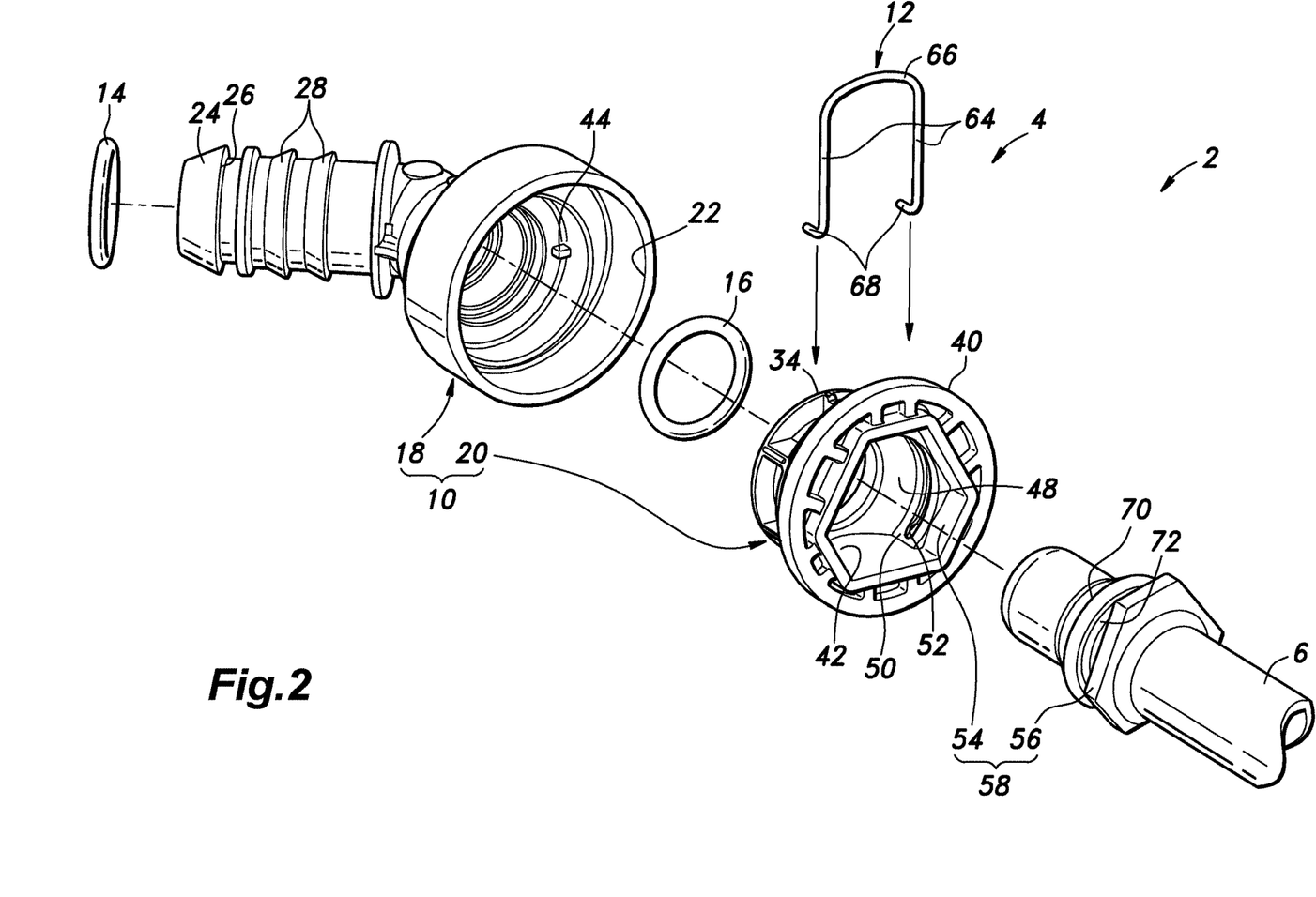
FIG. 2 is an exploded perspective view of the connecting arrangement.
Figure 3:
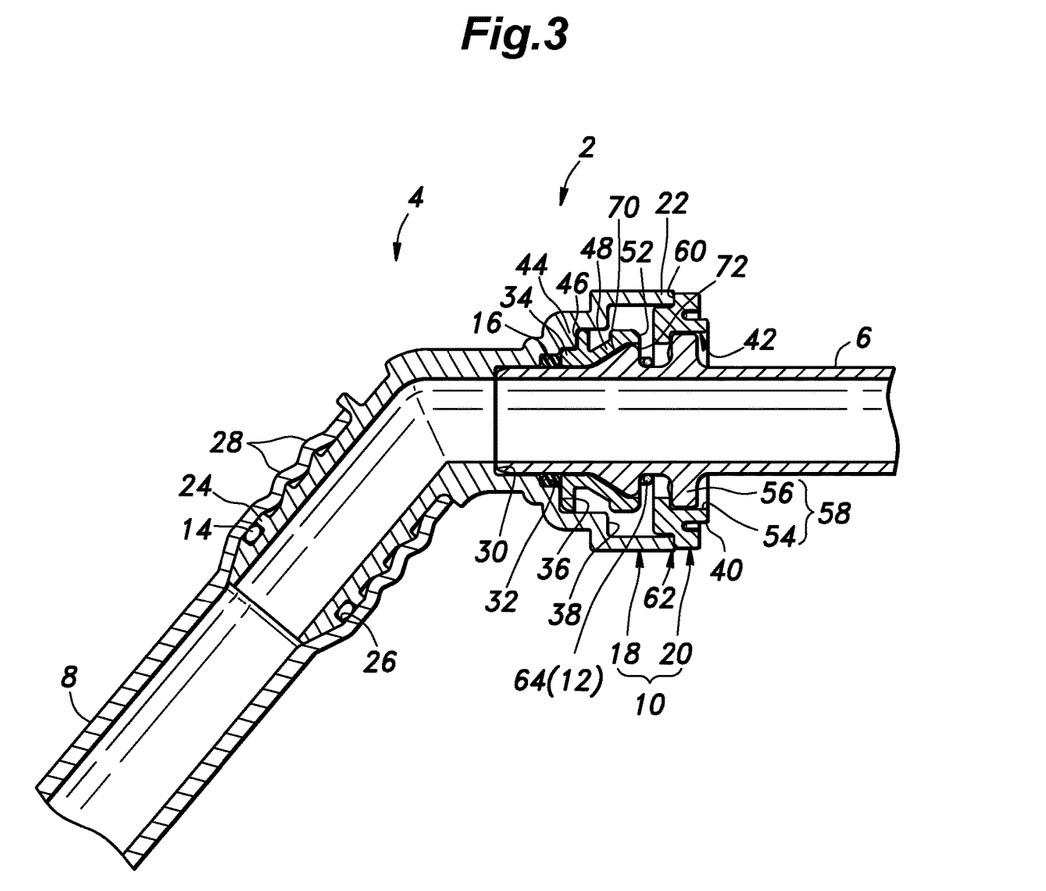
FIG. 3 is a sectional view of the connecting arrangement.

Referring to FIGS. 1 to 3, in the connecting arrangement 2 of the illustrated embodiment, a tube member 6 is connected to an article, consisting of a hose 8 in this case, via a connector 4. The connector 4 communicates the internal passages of the tube member 6 and the hose 8 with each other. The connector 4 includes a connector main body 10 defining a passage, a lock member 12 for engaging the tube member 6, and a first and a second seal member 14 and 16 for sealing the interfaces between the hose 8, the tube member 6 and the connector main body 10. The connector main body 10 includes a housing 18 having an end configured to be connected to the hose 8 and a sleeve 20 received by the other end of the housing 18, in turn, to receive an end of the tube member 6 therein.

The housing 18 consists of a molded plastic member which is generally cylindrical in shape, and has a bent middle part and an open end 22 which is enlarged in both inner and outer diameters for receiving the sleeve 20 therein.

A hose end 24 of the housing 18 provided in the opposite end of the open end 22 is configured to be received in an end of a hose 8 which is made of rubber or plastic material. The outer circumferential surface of the hose end 24 is provided with a circumferentially extending groove 26 for receiving a first seal member 14 consisting of an O ring in this case. The first seal member 14 extends closely along the inner circumferential surface of the hose 8 and the outer circumferential surface of the housing 18 to prevent leakage when the hose 8 is fitted onto the housing 18. The outer circumferential surface of the hose end 24 is provided with a pair of circumferentially extending projections 28 spaced further away from the end surface than the circumferentially extending groove 26 to prevent the hose 8 from detaching from the connector 4 by digging into the inner circumferential surface of the hose 8. The hose 8 is fixedly attached to the housing 18 by being frictionally engaged by the circumferentially extending projections 28 on the inner circumferential surface thereof and constricted by a metallic band not shown in the drawings on the outer circumferential surface.

The open end 22 is enlarged in the inner diameter thereof in a stepwise fashion toward the free end thereof. More specifically, the inner circumferential surface of the open end 22 is provided with a first step 30 abutting the free end of the tube member 6, a second step 32 receiving a second seal member 16, consisting of an O ring in this case, a third step 36 engaging the end surface of a front end 34 of the sleeve 20 and a fourth step 38 to define a gap between the outer circumferential surface of the sleeve 20 and the opposing inner circumferential surface of the housing 18, in that order toward the outermost end thereof. The open end 22 of the housing 18 is enlarged in outer diameter to allow the inner diameter of the inner circumferential surface to be increased.

The sleeve 20 consists of a generally cylindrical molded plastic member having an enlarged part 48 with an enlarged outer diameter at an end thereof. The sleeve 20 is provided with ribs for reinforcement purpose, but the description of the ribs is omitted in this disclosure. The small diameter end of the sleeve 20 is the front end 34 by which the sleeve 20 is fitted into the housing 18, and the large diameter end of the sleeve 20 is a rotation preventing end 40 for receiving the tube member 6 therein. The inner circumferential surface of the sleeve 20 defines an inner bore 42 for receiving an end of the tube member 6.

The front end 34 of the sleeve 20 is provided with a radial flange defining an end surface extending perpendicularly to the axial line of the cylindrical shape of the sleeve 20. The outer peripheral part of the end surface defined by the flange abuts the third step 36 of the housing 18, and the inner peripheral part of the end surface defines a groove for receiving the second seal member 16 in cooperation with the second step 32. The third step 36 is provided with a projection 44 that engages a corresponding positioning groove 46 formed in the end surface of the front end 34 to prevent the circumferential rotation of the sleeve 20 with respect to the housing 18 about the axial line. The projection 44 is a feature for temporarily securing the sleeve 20 to the housing 18 until these two parts are welded together, and is provided with a small thickness so that the projection 44 may be readily destroyed when the housing 18 is rotated with respect to the sleeve 20.

The inner circumferential surface of the enlarged part 48 of the sleeve 20 is progressively increased in diameter from the part thereof proximate to the front end 34 toward the rotation preventing end 40, and so is the outer circumferential surface of the rotation preventing end 40. The outer circumferential surface of the enlarged part 48 is generally spaced apart from the inner circumferential surface of the housing 18.

Between the enlarged part 48 and the rotation preventing end 40 is provided a retaining portion 50 consisting or a pair of retaining holes 52 passed radially through the sleeve 20 for retaining a lock member 12. The retaining holes 52 consist of circumferentially extending slots opposing each other symmetric to each other about the axial line.

The inner circumferential surface of the rotation preventing end 40 defines a non-circular recess 54 having a hexagonal cross section which is not rotationally symmetric and externally enveloping the inner circumferential surface of the retaining portion 50. The non-circular recess 54 defines a rotation preventing structure 58 for preventing relative rotation around the axial line between the sleeve 20 and the tube member 6 in cooperation with a fitting part 56 of the tube member 6 which will be described hereinafter. The outer circumferential surface of the rotation preventing end 40 is provided with a step 60 defined by an enlarged portion positioned on the side of the end surface of the sleeve 20, and the axially facing end surface of the step 60 abuts the end surface of the open end 22 of the housing 18. The outer diameter of the large diameter end of the rotation preventing end 40 substantially coincides with the outer diameter of the open end 22 of the housing 18 so that the outer circumferential surfaces of these two parts are smoothly connected to each other. The outer circumferential surface of the small diameter side of the rotation preventing end 40 is slightly spaced from the inner circumferential surface of the open end 22 of the housing 18.

The housing 18 and the sleeve 20 are joined to each other at a bonded part 62 formed by ultrasonically bonding the end surface of the open end 22 and the step 60 to each other. This bonded part 62 is formed as a frangible part that can be fractured more readily than the adjoining parts. The mechanical strength of the bonded part 62 can be adjusted by selecting the surface area of the bonded part 62, and the bonding strength of each unit surface area of the bonded part 62. In the illustrated embodiment, the housing 18 and the sleeve 20 do not abut each other substantially in any other parts so that external force tends to be concentrated in the bonded part 62, and the bonded part 62 can be readily fractured.

The lock member 12 consists of an elastically deformable wire member, and includes a pair of parallel leg portions 64 and a connecting portion 66 connecting the upper ends of the leg portions 64 to each other. The lock member 12 is configured to be retained by the sleeve 20 by being slid onto the sleeve 20 with the plane defined by the leg portions 64 and the connecting portion 66 extending perpendicularly to the axial line and the two leg portions 64 being passed into and retained by the retaining holes 52 of the sleeve 20, respectively. As a result, the two ends of each leg portion 64 is retained by the two end parts of the corresponding retaining hole 52, respectively, and the intermediate part of each leg portion 64 is located inside the bore 42 of the sleeve 20.

The sleeve 20 is provided with a groove not shown in the drawings to receive the connecting portion 66. By receiving the connecting portion 66 in this groove, the lock member 12 is prevented from moving in the axial direction or radially toward the bottom of the groove. The terminal end of each leg portion 64 is formed with a bent end 68 which is bent perpendicularly in the axial direction toward the hose 8. The lock member 12 is prevented from coming off the sleeve 20 on account of the bent ends 68 being engaged by the wall of the sleeve 20 adjoining the corresponding end of the retaining hole 52. Because the lock member 12 is normally covered by the housing 18 along with the retaining portion 50 of the sleeve 20 that retains the lock member 12, no part of the lock member 12 is exposed to the outer circumference of the connector main body 10. In other words, the lock member 12 is retained within the connector main body 10.

The tube member 6 which is made of plastic or metallic member is provided with a tapered surface 70, an engagement portion 72 and a fitting part 56, in that order from the extreme (front) end thereof, on the outer circumferential surface of the end thereof configured to be inserted into the sleeve 20.

The tapered surface 70 increases in outer diameter as one moves away from the end surface of the tube member 6. The angle of the tapered surface 70 with respect to the axial line is substantially equal to the angle of the inner circumferential surface of the enlarged part 48 of the sleeve 20 with respect to the axial line of the inner circumferential surface of the sleeve 20. Therefore, when the one end of the tube member 6 is inserted into the sleeve 20, the tapered surface 70 abuts or is positioned in close proximity of the inner circumferential surface of the enlarged part 48 of the sleeve 20.

The engagement portion 72 adjoins the tapered surface 70, and is formed as an annular groove extending in the circumferential direction.

The fitting part 56 is formed by a radial flange extending from the outer circumferential surface of the tube member 6, and is provided with a hexagonal cross section which is not rotationally symmetric and configured to be received in the non-circular recess 54 of the sleeve 20 in a complementary fashion. This shape can be conveniently achieved when the tube member 6 consists of an injection molded plastic member.

The mode of connecting and disconnecting the connector 4 to and from the tube member 6 is described in the following.

When the connector 4 is to be connected to the tube member 6, the fitting part 56 of the tube member 6 is aligned circumferentially with the non-circular recess 54 of the sleeve 20, and the tube member 6 is inserted into the sleeve 20 in the axial direction from the open end of the sleeve 20. Because the non-circular recess 54 and the fitting part 56 are complementary to each other and not rotationally symmetric, the circumferential positioning between the connector 4 and the tube member 6 is uniquely determined so that the bent hose end 24 of the connector 4 can be oriented in the prescribed direction without fail.

As the tube member 6 is inserted into the sleeve 20, the tapered surface 70 of the tube member 6 slides over the two leg portions 64 of the lock member 12, thereby forcing the two leg portions 64 away from each other, and causing an elastic deformation of the lock member 12. As the tube member 6 is pushed further into the sleeve 20, the two leg portions 64 of the lock member 12 are eventually released from the tapered surface 70, and return to the original configuration under the resiliency of the lock member 12 so that the intermediate part of each leg portion 64 is received in the engagement portion 72 of the tube member 6 consisting of a groove. The two ends of each leg portion 64 is retained by the sleeve 20, and the intermediate part of the leg portion 64 is engaged by the engagement portion 72 of the tube member 6 so that the axial movement of the tube member 6 with respect to the connector 4 (which may be a pushing in movement or pulling out movement) is prevented. Also, as the pushing in movement of the tube member 6 is also prevented by the abutting of the end surface of the one end of the tube member 6 with the first step 30 of the housing 18 and by the abutting of the fitting part 56 of the tube member 6 with the open end 22 of the sleeve 20, the engagement portion 72 may consist of a step having an abutting surface facing the fitting part 56, instead of the groove configuration.

When disconnecting the connector 4 from the tube member 6, it is necessary to destroy the connector 4. When a torque is applied between the connector 4 and the tube member 6 about the axial line, owning to the presence of the rotation preventing structure 58 between the tube member 6 and the sleeve 20, the sleeve 20 is forced into rotating with the tube member 6. As a result, a shear stress is caused in the connector main body 10. This shear stress causes frangible parts to be preferentially fractured. In the illustrated embodiment, the bonded part 62 between the housing 18 and the sleeve 20 is formed as a frangible part. Therefore, when a torque greater than a prescribed value is applied, the bonded part 62 between the housing 18 and the sleeve 20 is destroyed, and an assembly of the tube member 6, the lock member 12 and the sleeve 20 is separated from the housing 18. At this time, the projection 44 is also destroyed. Because the lock member 12 is freed from the housing 18 that covers the lock member 12, the lock member 12 is exposed to the outside. Therefore, the lock member 12 can be disengaged from the engagement portion 72 by using a tool or the like so that the lock member 12 can be separated from the tube member 6 and the sleeve 20. In this manner, the tube member 6 can be removed from the connector 4.

When the tube member 6 consists of a tube for conducting blow-by gas in a motor vehicle, no significant torque is caused between the tube member 6 and the connector main body 10 during normal use. Therefore, an inadvertent disconnection between the tube member 6 and the hose 8 is highly unlikely.

Once the housing 18 and the sleeve 20 are separated from each other, the connector 4 cannot be used once again. In order to reconnect the tube member 6 to the connector 4, it is necessary to replace the connector 4 or the connector 4 and the hose 8. Therefore, if the user has disconnected the tube member 6 from the connector 4, it is not possible for the user to reconnect the tube member 6 to the connector 4 with the existing components. Therefore, the user is discouraged from disconnecting the tube member 6 from the connector 4, and is encouraged to seek the help of a qualified mechanic. Thus, the user is prevented from reconnecting the tube member 6 to the connector 4, and hence the leakage of fluid such as blow-by gas due to improper maintenance work can be prevented from occurring.

Figure 4:
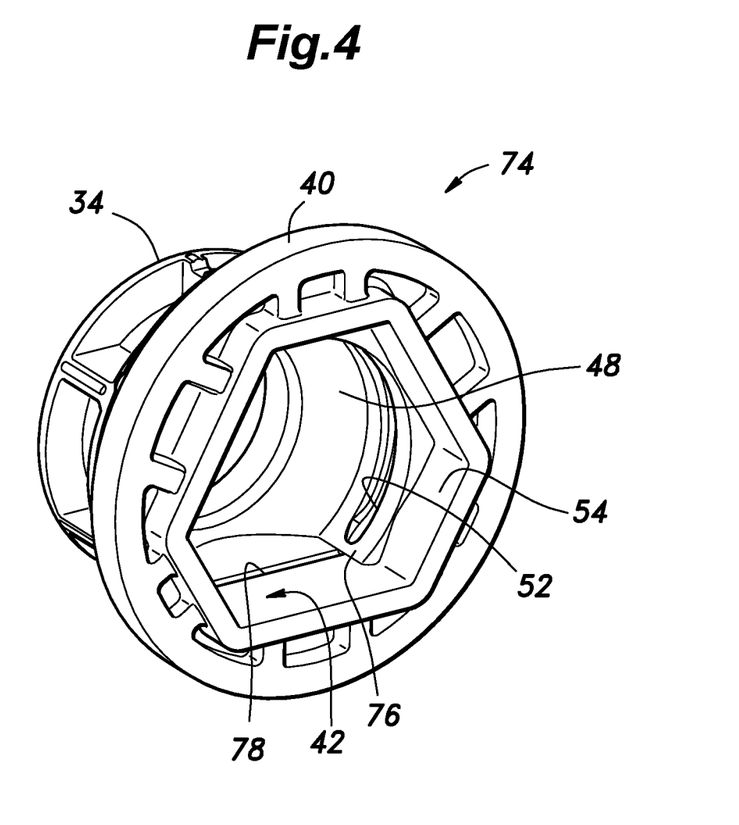
FIG. 4 is a perspective view of the sleeve of a modified embodiment.

With reference to FIG. 4, a first modified embodiment of the present invention is described in the following. In the following description, the parts corresponding to those of the preceding embodiment are denoted with like numerals without repeating the description of such parts. This modified embodiment differs from the preceding embodiment in the structure of the sleeve 74.

The retaining portion 76 of the sleeve 74 is provided with a circumferentially extending thin-walled portion 78 (except for the parts where the retaining holes 52 are formed) in the form of a groove. In this case, this thin-walled portion 78 as well as the bonded part 62 serves as the frangible part. It is also possible to form a series of holes along the circumferential direction, in place of the thin-walled portion 78, as a frangible part. Alternatively, the sleeve 74 may be welded to the housing 18 in a part thereof which is closer to the front end than the thin-walled portion 78 so that the frangible part is formed solely by the thin-walled portion 78. When a torque is applied between the tube member 6 and the connector main body 10 in order to disconnect the tube member 6, these frangible parts are fractured, and the sleeve 74 is severed in the retaining portion 76 so that the tube member 6 is separated from the housing 18 and the lock member 12.

Figure 5:
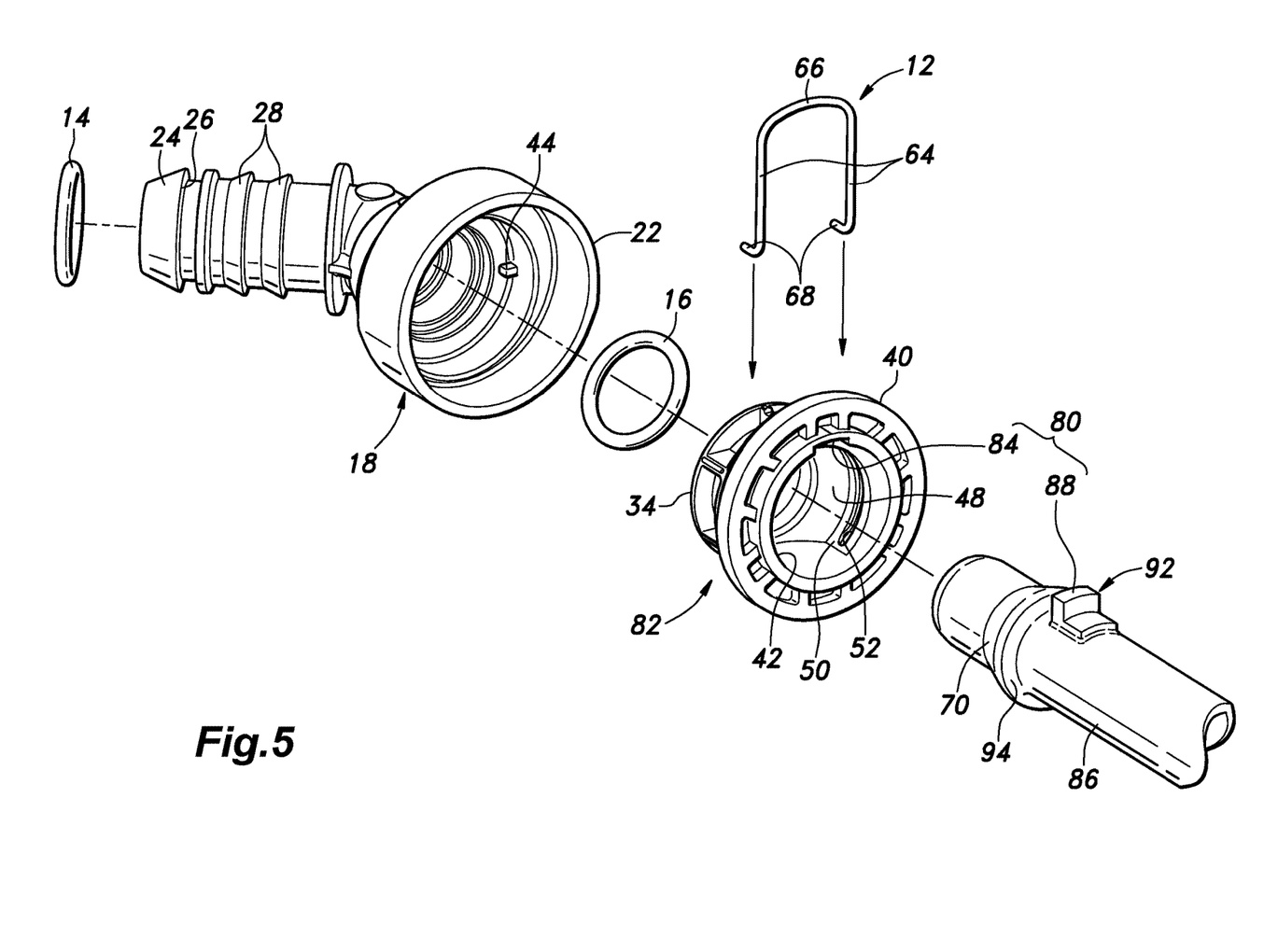
FIG. 5 is an exploded perspective view of the connecting arrangement of another modified embodiment.

A second modified embodiment of the present invention is described in the following with reference to FIG. 5. This modified embodiment differs from the preceding embodiments primarily in the structure of the rotation preventing mechanism 80.

The rotation preventing mechanism 80 comprises a non-circular recess 84 of the sleeve 82 and a fitting part 88 of the tube member 86. The non-circular recess 84 consists of a single recess formed on the inner circumference side of the rotation preventing end 90 of the sleeve 82 so as to extend radially outward. A projecting piece 92 is fixedly provided on the outer peripheral surface of the tube member 86. This modified embodiment is particularly advantageous when the tube member 86 is made of metallic material. In such a case, the projecting piece 92 may be welded to the outer circumferential surface of the tube member 86, and the free end of the projecting piece 92 serves as a fitting part 88 that fits into the non-circular recess 84 in a complementary fashion.

The engagement portion 94 in this case consists of a step formed on the boundary of the tapered surface 70. The pulling out movement of the tube member 86 is restricted by the engagement portion 94 being engaged by the lock member 12, and the pushing in movement of the tube member 86 is restricted by the end surface of the one end of the tube member 86 abutting the first step 30 of the housing 18 or by the fitting part 88 of the tube member 86 abutting the open end 22 of the sleeve 20.

The present invention has been described in terms of specific embodiments thereof, but is not limited by such embodiments, and can be modified in a number of different ways. For instance, the frangible part may be configured to be destroyed by a relative tensile force applied between the connector main body and the tube member, instead of a torque applied between these two parts. In the first modified embodiment, the frangible part which may consist of a thin-walled portion or a series of holes may be positioned also in other parts of the sleeve or the housing as long as the lock member is exposed to the outside once the connector main body is destroyed. The sleeve may be attached to the housing not only by ultrasonic welding but also by other means such as vibration welding, thermal welding, laser welding and adhesive bonding. The complementary fitting structure provided between the tube member and the sleeve may consist of any non-circular fitting arrangement. The rotational asymmetry is not essential for the rotation preventing mechanism, and a rotationally symmetric arrangement may also be used particularly when the connector is not bent, and the fluid passages are linearly connected.

GLOSSARY OF TERMS 2 connecting arrangement
4 connector
6, 86 tube member
8 hose
10 connector main body
12 lock member
18 housing
20, 74, 82 sleeve
52 retaining hole
54, 84 non-circular recess
56, 88 fitting part
58, 80 rotation preventing structure
62 bonded part
64 leg portion
70 tapered surface
72, 94 engagement portion
78 thin-walled portion
92 projecting piece

The invention claimed is:

1. A connecting arrangement for connecting a tube member to an article, comprising:
   a tube member provided with an engagement portion on an outer circumferential surface thereof;
   a connector main body attached to an article to be connected and defining an inner bore for receiving an end of the tube member; and
   a lock member positioned on an inner circumferential surface side of the connector main body and engaging the engagement portion so as not to be disengaged from outside;
   wherein the connector main body is provided with a frangible part that is preferentially destroyed when a force greater than a prescribed level is applied thereto, and is positioned so as to place the lock member in an accessible condition for removal of the lock member when the connector main body is destroyed, and
   wherein a rotation preventing structure is provided between the connector main body and the tube member for preventing a relative rotation between the connector main body and the tube member when the lock member engages the engagement portion, and the force consists of a torque that tends to rotate the connector main body and the tube member relative to each other.

2. The connecting arrangement according to claim 1, wherein the rotation preventing structure comprises a non-circular recess provided in an end surface of the connector main body and a fitting part of the tube member which is configured to fit into the non-circular recess in a complementary fashion.

3. The connecting arrangement according to claim 2, wherein the fitting part comprises a flange provided on an outer periphery of the tube member.

4. The connecting arrangement according to claim 2, wherein the non-circular recess and the fitting part are configured to fit one into another only when the non-circular recess and the fitting part are aligned with each other at a prescribed angular relationship.

5. A connecting arrangement for connecting a tube member to an article, comprising:
   a tube member provided with an engagement portion on an outer circumferential surface thereof;
   a connector main body attached to an article to be connected and defining an inner bore for receiving an end of the tube member; and
   a lock member positioned on an inner circumferential surface side of the connector main body and engaging the engagement portion so as not to be disengaged from outside;
   wherein the connector main body is provided with a frangible part that is preferentially destroyed when a force greater than a prescribed level is applied thereto, and is positioned so as to place the lock member in an accessible condition for removal of the lock member when the connector main body is destroyed,
   wherein the connector main body comprises a housing provided with an open end facing away from the article to be connected and a sleeve received in the open end and connected to the housing, the sleeve defining the inner bore,
   wherein the lock member is retained by the sleeve and covered by the housing, and
   wherein the frangible part comprises a bonded part between the housing and the sleeve, a breakable part consisting of a thin walled portion and/or holes formed in a part of the sleeve retaining the lock member, or both.

6. A connecting arrangement for connecting a tube member to an article, comprising:
   a tube member provided with an engagement portion on an outer circumferential surface thereof;
   a connector main body attached to an article to be connected and defining an inner bore for receiving an end of the tube member; and a lock member positioned on an inner circumferential surface side of the connector main body and engaging the engagement portion so as not to be disengaged from outside;

wherein the connector main body is provided with a frangible part that is preferentially destroyed when a force greater than a prescribed level is applied thereto, and is positioned so as to place the lock member in an accessible condition for removal of the lock member when the connector main body is destroyed, wherein the connector main body comprises a housing provided with an open end facing away from the article to be connected and a sleeve received in the open end and connected to the housing, the sleeve defining the inner bore, wherein the lock member is retained by the sleeve and covered by the housing, and wherein the sleeve comprises a pair of retaining holes radially passed through the sleeve and extending circumferentially, and the lock member is configured to engage the engagement portion of the tube member by being received in the retaining holes.

7. The connecting arrangement according to claim 6, wherein the lock member comprises a wire member including a pair of parallel leg portions, and the engagement portion is provided on an outer periphery of the tube member, the engagement portion including a groove or a step for engaging the leg portions.

8. The connecting arrangement according to claim 7, wherein the leg portions are made of elastically deformable material, and a front end part of the tube member is provided with a tapered surface for pushing apart the leg portions away from each other as the tube member is inserted.

* * * * *